United States Patent

[11] 3,604,693

| [72] | Inventors | Rudi Groepler<br>Schoenberg, Taunus;<br>August Jendrusch, Obererlenbach, both of,<br>Germany |
|---|---|---|
| [21] | Appl. No. | 814,565 |
| [22] | Filed | Apr. 9, 1969 |
| [45] | Patented | Sept. 14, 1971 |
| [73] | Assignee | Vickers-Zimmer Aktiengesellschaft<br>Planung und Bau Von Industrieanlagen<br>Frankfurt, Germany |
| [32] | Priority | Apr. 10, 1968 |
| [33] | | Germany |
| [31] | | P 17 78 237.5 |

[54] PROCESS AND APPARATUS FOR MELTING BULKY SCRAP MATERIAL FOR SYNTHETIC POLYMERS
15 Claims, 1 Drawing Fig.

[52] U.S. Cl............................................................ 263/40, 126/343.5 R

[51] Int. Cl................................................................ F27b 17/00
[50] Field of Search............................................... 263/27, 30, 40; 126/343.5, 343.5 A

[56] References Cited
UNITED STATES PATENTS

| 3,010,147 | 11/1961 | Davies et al. ................ | 126/343.5 A |
| 3,015,480 | 1/1962 | Nawrath et al. ............... | 126/343.5 A |
| 3,163,888 | 1/1965 | Shattuck ...................... | 126/343.5 A |

Primary Examiner—John J. Camby
Attorney—Molinare, Allegretti, Newitt & Witcoff

ABSTRACT: In a process and apparatus for melting bulky synthetic polymer scrap material, the scrap material is introduced into a chamber by rollers and is compressed in the chamber by a piston. The compressed material is heated to melt it and the gases escaping from the material are withdrawn from the chamber in a direction opposite to the direction in which the molten material is withdrawn.

PATENTED SEP 14 1971
3,604,693
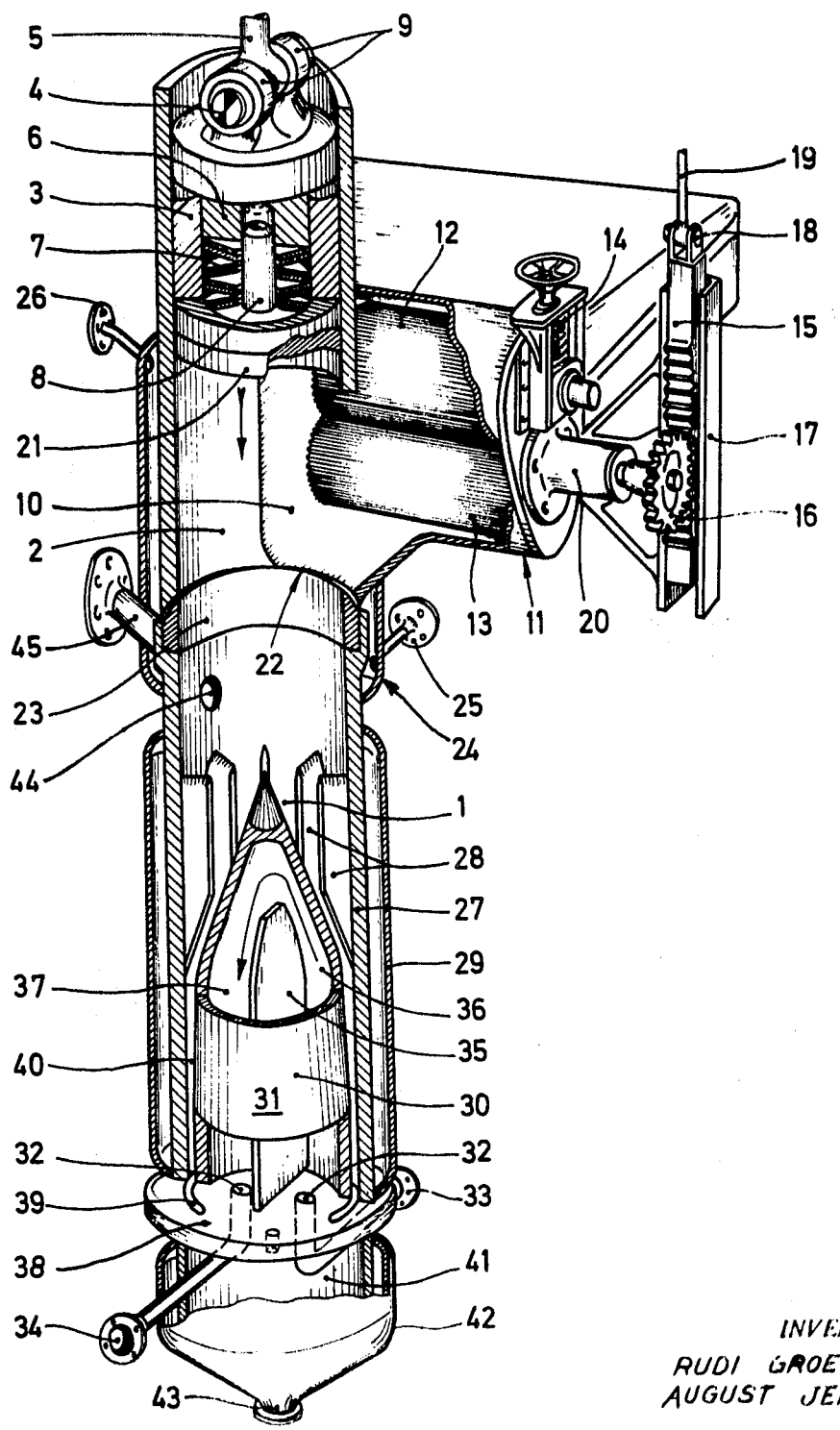
INVENTORS
RUDI GROEPLER &
AUGUST JENDRUSCH
BY Bair, Freeman
& Molinare
ATTORNEYS

PROCESS AND APPARATUS FOR MELTING BULKY SCRAP MATERIAL FOR SYNTHETIC POLYMERS

BACKGROUND AND SUMMARY OF THE INVENTION

The invention relates to a process and apparatus for melting bulky polymeric material of synthetic linear high polymers such as polyamides, polyesters and polyolefins, particularly such material which is in the form of wool, staple fibers or starting cakes, to enable the scrap material to be reused.

In the manufacture of filaments by melt spinning high polymers, some scrap material is practically always formed. Some of this scrap results from interruptions in the spinning process which are unavoidable when, for example, the bobbins are changed, the yarn breaks or the spun material is changed. Generally, the quality of the scrap is no worse, or not appreciably worse, than that of the usable end product. Since scrap is formed in large quantities, its cost is appreciable and it is highly desirable to recover or rework the scrap.

Polyamide scrap, by way of example, can be melted, but since even small amounts by weight of polyamide take up an appreciable space, the melting tanks used must be quite large. For example, the bulk density of polyamide wool scrap is often between 0.1 and 0.15 kg./m.$^3$, so that 1 kg. of scrap occupies a volume of 7 to 10 m.$^3$. This is approximately $10^4$ times the volume of the equivalent polymer melt. Also, a bulky wool of this kind has extremely good thermal insulation properties so that it is quite difficult to heat a large volume sufficiently to melt all of it. Even if oxygen is removed by employing an inert gas atmosphere, it is virtually impossible to prevent the portion of the scrap which touches the tank wall from being exposed to high temperatures much longer than that in the middle of the tank. For well-known reasons, the contents of the tank cannot be mixed or stirred. Moreover, the low density of the scrap prevents the molten polymer which contacts the walls of the lower portions of the melting tank from being replaced by solid material because the solid unmelted material floats on the liquid. The heat distribution in the scrap is, therefore, uneven and only limited reuse of the molten material is possible.

Attempts have been made to increase the density of the scrap by breaking it up, i.e. cutting it, but since even short fibers are very bulky, this has only met with limited success. Also, breaking up the scrap fibers by the use of cutting mills is quite expensive. In order to prevent reduction in quality, it has been proposed that polyamides should be depolymerized, cleaned and then repolymerized. For example, there is a process for recovering ε-caprolactam from polyamide, in which the polymer is converted into the monomer caprolactam by adding dimeric ε-caprolactam and distilling at 280° C. in a vacuum. Since the resulting product must then be polymerized again, the process is both expensive and complex. However, the main disadvantage is that a large reactor is required, in which the heat transfer is unsatisfactory. Even where superheated steam is injected for the purpose of depolymerization, satisfactory results are not obtained. After the scrap has been melted and depolymerized, the reactor is less than 10 percent full.

In order to obviate the disadvantages of substantially less than complete filling of the reactor and of depolymerization, it has been proposed that the polyamide scrap and the monomer lactam obtained from washing the filaments be subjected to known polymerization conditions in a common reactor. A process of this kind has some advantage over the prior proposals, but it assumes that the ratio of the quantity of lactam recovered to the quantity of scrap is within a certain range and this is not always the case. Also, a process of this kind requires chemical measurements which, on an industrial scale, necessitate the provision of special apparatus and control systems and small quantities of solid materials, such as fibers and the like, cannot be used for economic reasons.

We have devised a process for melting bulky scrap polymeric material to enable it to be reused, which does not involve either chemical treatment or the uneven heating of the material in large, expensive apparatus and in which either cut or uncut scrap may be processed.

In the process of the invention, the scrap is gently and then more rapidly heated to a temperature above its melting point, while the thermally insulating gases in the scrap escape before it melts. The apparatus employed in the process is extremely compact and it is a particular advantage of the apparatus and process of this invention that cut or uncut scrap can be processed.

The process of the invention can be carried out discontinuously, with a single compression step or, more preferably, the melting process may be carried out continuously or at least substantially continuously while the compression step is carried out periodically. For example, the compression operation is carried out intermittently and further bulky material is added to the compressed material in the chamber after each operation, and the molten material may be removed continuously or batchwise.

In one aspect the process employing the principles of our invention for melting bulky scrap material formed of one or more synthetic linear high polymers, comprises compressing the bulky material in a chamber to reduce its volume by from 50 to 90 percent, heating the compressed material to melt it, and removing the molten material from the chamber in a direction substantially opposed to that in which gases escaping from the material are withdrawn from the chamber.

The apparatus incorporating the principles of our invention, and which is particularly adapted for melting bulky scrap material formed of one or more synthetic polymers, includes a chamber, means for supplying bulky polymeric material thereto, means for compressing the material within said chamber, means for heating the compressed material to melt it, means for removing the molten material from the chamber and means for removing gases escaping from the material from the chamber in a direction substantially opposed to the direction of movement of the material through the chamber.

Preferably, the apparatus includes a melting chamber having an upper and a lower zone, a piston slidable between an upper and a lower level within the upper zone, means for heating the lower zone, a material inlet aperture in a wall of the upper zone below said upper level, means for removing gases escaping from the material from the chamber in an upward direction, and a material outlet aperture which is formed in a wall of the lower zone and is arranged to feed the material to a molten material collection chamber.

These and other objects, features and advantages of our invention will become evident upon considering the following detailed description.

BRIEF DESCRIPTION OF THE DRAWING

In the course of this description, the drawing will frequently be referred to, in which a sectioned perspective view of a preferred embodiment of the apparatus incorporating the principles of our invention is shown.

DESCRIPTION OF THE PREFERRED EMBODIMENT

Referring to the drawing, the apparatus, which will first be described, comprises a tubular chamber having a lower zone 1 and an upper zone 2. In the upper zone is a piston 3 having an insert 6 which is longitudinally displaceable relative to the piston. The piston and insert are positively connected to one another by a set of cup springs 7 and a pin 8 helps to center the cup springs. Two gudgeon pin bosses 9 on the top of the insert 6 are operatively connected to the piston rod 5 by way of a gudgeon pin 4. The upper distal end of the piston rod 5, and the crankshaft cooperating with it, have been omitted for simplicity. The insert 6, springs 7 and pin 8 are so arranged that they act as an overload safety device if the capacity of the apparatus proves insufficient and the scrap obstructs the compression chamber. If this occurs, the piston 3 gives slightly relative to its insert 6, reducing its stroke and, therefore, the compression applied to the scrap material. Alternatively, of course, the overload safety device could be in the form of a telescope arrangement in the piston rod 5 or a sliding coupling in the crank drive (not shown).

An inlet aperture 10 is provided in the upper zone 2 within the path of the piston stroke for supplying scrap to the apparatus. Since the scrap is bulky, it does not readily slide of its own weight into the chamber. The scrap material is therefore delivered to this aperture by a conveyor 11 which comprises a pair of cooperating rollers 12 and 13 with longitudinal ribs formed on their surfaces. The gap between the rollers is regulated to control the volume of material supplied by means of an adjusting device 14 in the form of a worm drive. Adjustable coil springs (not shown) may also be associated with the rollers for regulating the pressure of the rollers is needed. One of the rollers, in this case the lower roller 13, is driven by way of a rack 15 and pinion 16. The rack is guided by a sliding guide 17 and is connected by a pin 18 and connecting rod 19 to the drive (not shown), which is preferably identical to the drive for the piston 3 to drive the rollers in response to movement of the piston. A suitable overload safety device, for example a sliding coupling (not shown) at a suitable place in the crankshaft as described above, may be provided if desired to reduce the material delivery rate of the conveyor 11 if, due to scrap obstructing the compression chamber 1, the ability of the piston 3 to force material through the apparatus is diminished or disappears.

Since the rack 15 necessarily produces a reciprocating motion, a freewheel transmission 20 is positioned between the pinion 16 and roller 13 in order to impart a conveying action to the rollers 12 and 13 by converting the alternating rotational movement of the pinion 16 into an intermittent rotational movement in the same direction. The roller 12 may be driven by engagement of its profiled surface with that of the roller 13 or by a spur gear (not shown).

Alternatively, however, the roller-type conveyor means may be replaced by a screw conveyor in which case a large-capacity feed hopper is preferably provided upstream of the screw conveyor.

The bottom edge 21 of the piston and the bottom edge 22 of the aperture have sharp edges and cooperate to form a cutting device for the scrap. In the particular embodiment illustrated, the bottom edge 22 of the aperture is formed with a special cutting ring 23 of hardened, corrosion-resistant steel which rests on a shoulder formed in the cylinder. The cutting edges prevent the piston from becoming jammed by long fiber wool.

The upper zone 2 is preferably enclosed by a cooling jacket 24 with fluid inlet and outlet connections 25 and 26 in order to prevent excessive heating of the wall of the upper zone, by conduction for example, which would cause premature melting of the scrap and consequent fouling of the surface. The lower zone 1 is formed of a cylindrical jacket 27 which is provided with additional heat transfer surfaces in the form of inwardly directed ribs 28 which may either extend parallel to the axis of the jacket, as illustrated, or may be helical. The cylindrical jacket 27 is surrounded by a heating jacket 29 through which fluid, for example diphenyl vapor, is passed.

In order to provide further heating surfaces, a heating member 30 is provided in the lower zone which preferably has a streamlined shape and is hollow so that heating fluid can be passed through it. In the particular embodiment illustrated, the upper part of the heating member is in the form of a hollow cone and the lower part 31 a truncated cone of smaller apical angle. The angle of the lower part with the chamber wall is preferably small to assist in preventing the scrap which is not yet melted from springing upwardly in the chamber when the piston moves upward and the compression is relieved. Alternatively, however, the heating member may be formed with a regular outer surface is desired. In the particular embodiment illustrated, the heating member is of circular cross section but could, like the cylindrical jacket 27, have ribs projecting radially into the chamber, or it could have a substantially star-shaped cross section. Circular cross sections, however, give the heating member maximum resistance to pressure. The lower end of the heating member is connected, by two ports 32, to inlet and outlet conduits 33 and 34. Between the ports 32, there is a partition 35 having a width which corresponds to the internal diameter of the heating member. The partition terminates slightly below the apex of the heating member, so that the heating fluid can pass from a chamber 36 into a chamber 37 inside the top of the heating member.

Near the lower truncated cone portion of the heating member, a wedge-shaped annular space 40 is formed between the inner wall of the cylindrical jacket 27 and the heating member 30. The angle between the chamber wall and the wall of the heating member 30 is small, preferably 3° to 5° or less which provides for a decrease in scrap volume adjacent the bottom of the space. As a result, the preplasticized polyamide rapidly changes into a melt in this space only shortly before leaving the apparatus and can then be discharged rapidly from the space.

The lower zone 1 has a bottom flanged plate 38. This plate contains, in addition to the ports 32 for the heating fluid, ports 39 which connect the lower end of the annular space 40 to a melt-collecting chamber 41 situated beneath the flanged plate and attached to it. The collecting chamber 41 has a heating jacket 42 with intake and discharge pipes (not shown) for heating fluid. The melt collected in the chamber is drawn off through the discharge aperture 43 for further processing, for example to be added to a stream of fresh polymer which is to be spun into filaments, or to produce an intermediate product by spinning it into ropes which are then processed into chips.

Between the intake aperture 10 and the melting zone in the lower portion of the annular gap 40, is a ventilation port 44 through which the gases in the scrap, which escape during the decrease in volume and during softening, are removed together with other gases escaping from the polymeric material in a direction opposite to which the scrap passes through the apparatus. These gases may, for example, be derived from the oils employed in the spinning or from water remaining after washing the scrap. It is generally advisable to wash the scrap at least in water before melting it. It is not essential to remove all traces of water from the scrap, before introducing it into the apparatus of the invention since the water can be and is removed during processing. The ventilation port 44 is extended outward by a conduit 45 which is connected to a suction pump (not shown). The pressing operation is facilitated if the air in the chamber is reduced below atmospheric pressure to promote the escape of gases from the material.

The apparatus of the invention can be used to melt polymers of all types including polyamides, polyesters and polyolefins. The apparatus may, instead of being arranged vertically as in the illustrated embodiment, be arranged horizontally. Moreover, the piston and/or conveyor need not be driven by one or more crank drives; individual hydraulic or pneumatic drives may be provided.

When the means for compressing the material within the chamber comprises the piston 3 which is slideable within the chamber, the scrap must be fed intermittently to the apparatus and the rollers 12 and 13 are preferably operated intermittently through the rack 15 and pinion 16 and freewheel transmission 20 which are coupled to the drive for the piston. Advantageously, the scrap should be fed by the rollers 12 and 13 during the upward stroke of the piston, beginning as soon as the piston rises above the material input level in the chamber. Thus, if the rollers operate intermittently, the piston drive and roller drive should be out of phase. This may, for example, be effected by using a common crankshaft in which the cranks for the piston rod 5 and of the roller-connecting rod 19 are angularly spaced by a predetermined angle of rotation. The piston is constructed so as to reduce the volume of the scrap by compression of the bulky material by from 50 to 90 percent, and preferably by from 60 to 70 percent.

In practice, the scrap is gently and then more rapidly heated to a temperature above its melting point as the scrap moves downwardly in the chamber and further into the decreasing annular space. A tubular chamber in which the upper and lower zones and the heating and cooling jackets are coaxial is preferred since such form of apparatus provides maximum strength and melting capacity and minimizes constructional expense.

EXAMPLE 150 kg. polyamide scrap, in the form of loose wool with a bulk density of 0.12 kg./m.$^3$, were washed and partially dried to a maximum residual water content of 5 percent. The scrap was then fed continuously into the apparatus of the invention over a period of 1 hour. The piston had a stroke of 300 mm. and was operated at 45 strokes per minute. The jacket of the lower zone and the heating member had a surface temperature of 280° C. Approximately 142 kg. of molten polyamide at a temperature of 260° C., collected in the collecting chamber in 1 hour. The difference in weight between the quantity of scrap supplied and the melt formed over the same period was thus 8 kg., which represented the water, and small quantities of preparation vapors and monomer vapors escaping from the polymer. The polyamide from the collecting chamber was filtered and then spun satisfactorily.

It is to be understood that the embodiment of the invention which has been described is merely illustrative of one application of the principles of the present invention. Numerous modifications may be made by those skilled in the art without departing from the true spirit and scope of the invention.

What is claimed is:

1. A process for melting bulky scrap material formed of one or more synthetic linear high polymers which comprises, compressing the bulky material in a chamber to reduce its volume by from 50 to 90 percent, heating the compressed material to melt it, withdrawing the gases escaping from the material in a first direction, and removing the molten material from the chamber in a direction substantially opposed to the direction in which the gases escaping from the material are withdrawn from the chamber.

2. The precess of claim 1, in which the bulky material is compressed to reduce its volume by from 60 to 70 percent.

3. The process of claim 1 in which the compression of the bulky material is carried out intermittently and additional bulky material is added to the compressed material in the chamber after each intermittent compression.

4. The process of claim 1 including reducing the pressure in the chamber below atmospheric pressure to promote the escape of gases from the material.

5. Apparatus for melting bulky scrap material formed of one or more synthetic linear high polymers which comprises, a chamber, means for supplying the bulky polymeric material thereto, compression means within said chamber for reducing the volume of the material by a substantial amount, means for heating the compressed material to melt the material, means for removing the molten material from the chamber, and means communicating with the portion of the chamber which contains the compressed material for withdrawing gases escaping from the material from the chamber in a direction substantially opposed to the direction of movement of the material through the chamber.

6. Apparatus for melting bulky scrap material formed of one or more synthetic linear high polymers which comprises, a melting chamber having an upper and a lower zone, a piston movable between an upper and lower level within the upper zone for compressing and reducing the volume of said scrap material by a substantial amount, means for heating the lower zone to melt the material, a material inlet aperture in a wall of the upper zone below said upper level, means communicating with the lower zone of the chamber for withdrawing gases escaping from the material from the chamber in an upward direction, and a molten material collection chamber communicating with the lower zone and arranged to collect the molten material.

7. The apparatus of claim 6 including a pair of cooperating rollers having a gap therebetween for feeding the bulky scrap material to said material inlet aperture.

8. The apparatus of claim 7 wherein said rollers have roughened surfaces and including gap-adjusting means for adjusting the size of said roll gap.

9. The apparatus of claim 7 including drive means for driving said piston and said rollers, said drive means including a rack and pinion driving at least one of said rollers in response to the movement of said piston.

10. The apparatus of claim 6 in which said means for heating the lower zone includes a heating jacket which surrounds the zone.

11. The apparatus of claim 6 including a plurality of heat-distributing vanes extending inwardly from the sidewall of the chamber in said lower zone.

12. The apparatus of claim 6 in which said means for heating the lower zone includes a heating member in said lower zone, said heating member being constructed and arranged such that the cross-sectional area of said lower zone decreases from the upper to the lower part of the zone.

13. The apparatus of claim 6 including cutting edges formed by cooperation of edges on said piston and said material inlet aperture.

14. The apparatus of claim 6 including a gas escape aperture defined in the wall of the chamber in the lower zone below the material inlet aperture.

15. The apparatus of claim 6 in which said chamber comprises a tubular cylinder.